United States Patent
Wakida et al.

(10) Patent No.: US 8,540,598 B2
(45) Date of Patent: Sep. 24, 2013

(54) SPEED CHANGE GEAR AND MANUFACTURING METHOD THEREFOR

(75) Inventors: Mayuko Wakida, Anjo (JP); Motoyasu Yamamori, Nagoya (JP); Atsushi Ando, Kariya (JP); Kazuya Hattori, Nagoya (JP); Hiromichi Ota, Kariya (JP); Yoshinobu Kato, Toyohashi (JP); Koji Nagumo, Anjo (JP); Tomohiro Honda, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 422 days.

(21) Appl. No.: 13/074,648

(22) Filed: Mar. 29, 2011

(65) Prior Publication Data

US 2011/0245030 A1 Oct. 6, 2011

(30) Foreign Application Priority Data

Mar. 30, 2010 (JP) ................................. 2010-078671

(51) Int. Cl.
*F16H 23/00* (2006.01)
(52) U.S. Cl.
USPC .......................................... 475/163; 475/177
(58) Field of Classification Search
USPC ................... 475/162, 163, 176, 177
See application file for complete search history.

(56) References Cited

U.S. PATENT DOCUMENTS

| 4,898,065 A | * | 2/1990 | Ogata et al. ................... 475/179 |
| 5,322,485 A | * | 6/1994 | Haga ............................. 475/178 |
| 5,701,671 A | | 12/1997 | Haga |
| 7,819,770 B2 | * | 10/2010 | Haga et al. .................... 475/176 |
| 2004/0198543 A1 | | 10/2004 | Christ |
| 2010/0113206 A1 | * | 5/2010 | Wang et al. ................... 475/180 |

FOREIGN PATENT DOCUMENTS

| JP | 7-248046 | 9/1995 |
| JP | 2002-266955 | 9/2002 |
| WO | WO 03/019041 A1 | 3/2003 |
| WO | WO 2006/075752 A1 | 7/2006 |

OTHER PUBLICATIONS

Extended European Search Report issued on Mar. 14, 2012 in the corresponding European Application No. 11160131.6.

* cited by examiner

*Primary Examiner* — Justin Holmes
(74) *Attorney, Agent, or Firm* — Oblon, Spivak, McClelland, Maier & Neustadt, L.L.P.

(57) ABSTRACT

A speed change gear includes: an internal gear member; an eccentric member; an oscillating member; a pair of first and second rotating members; and a pin that is supported at both ends by insertion holes of the first and second rotating members. The insertion hole and the insertion hole have the same diameter. The outside diameter of the other side end portion of the pin is smaller than the outside diameter of one side end portion of the pin such that the one side end portion is press-fitted in the corresponding insertion hole and the other side end portion is supported by the corresponding insertion hole.

5 Claims, 5 Drawing Sheets

SPEED CHANGE GEAR AND MANUFACTURING METHOD THEREFOR

INCORPORATION BY REFERENCE/RELATED APPLICATION

This application claims priority to Japanese Patent Application No. 2010-078671 filed on Mar. 30, 2010 the disclosure of which, including the specification, drawings and abstract, is incorporated herein by reference in its entirety.

BACKGROUND OF THE INVENTION

1. Field of the Invention

The invention relates to a speed change gear.

2. Discussion of Background

A speed change gear is used as a speed reduction gear or a speed increasing gear that changes the speed of rotation input from a motor, or the like. As such a speed change gear, there is a known speed reduction gear that uses a planet gear mechanism in order to obtain a high change gear ratio. For example, a speed reduction gear described in Japanese Patent Application Publication No. 2002-266955 (JP-A-2002-266955) and Japanese Patent Application Publication No. 7-248046 (JP-A-7-248046) oscillatingly rotates a planet gear with the rotation of an input shaft and then transmits and outputs only the axial rotation component of the planet gear via pins that extend through through-holes formed in the planet gear. In the above speed reduction gear, the pins may be supported at both ends by an output member and a support member that are arranged with the planet gear interposed therebetween.

For example, JP-A-2002-266955 describes a configuration where one end portion of each pin is fixed to the output member and the other end portion of each pin is held by the support member. In the above configuration, it is conceivable that each pin hole of the output member may be different in diameter from each pin hole of the support member. More specifically, each pin hole of the support member is formed to be larger in diameter than each pin hole of the output member.

For this reason, it is conceivable that the pin holes of the support member and the pin holes of the output member may be separately machined and, as a result, the centers of the corresponding pairs of pin holes may be misaligned from each other. Therefore, each of the pin holes of the support member, which have a large diameter, has a relatively large dimensional tolerance so as to absorb machining errors of the pin holes of the output member. This may increase the distance between the outer peripheral surface of each pin and the inner peripheral surface of a corresponding one of the pin holes of the support member. Thus, it may be difficult to appropriately support the pins in a state where the speed reduction gear is driven.

In addition, for example, JP-A-7-248046 describes a configuration where each pin is supported at both ends. In this configuration, a nut is screwed and fastened to a threaded portion of each pin in order to allow assembling and disassembling. The pins in this configuration fasten the output member, a spacer and the support member using snap rings arranged at one end portions of the pins and the nuts screwed to the threaded portions at the other end portions of the pins. In the above configuration, because the pins that transmit power are not press-fitted to the output member, the diameter of each pin hole of the output member is set to be larger than the outside diameter of each pin. Then, there is a possibility that, in a state where the speed reduction gear is driven, the center of each pin may offset from the center of a corresponding one of the pin holes of the output member to cause a backlash of an output shaft in the circumferential direction.

Furthermore, JP-A-7-248046 describes, as a related art, a configuration where the pins are press-fitted to the output member and the support member and are supported at both ends. In the above configuration, because there is no gap between the outer peripheral surface of each pin and the inner peripheral surface of a corresponding one of the pin holes of each of the output member and the support member, it is conceivable that a backlash of an output shaft in the circumferential direction may be suppressed. However, because both end portions of each pin are press-fitted to the output member and the support member, work for assembling the gear may be difficult. In addition, if the dimensional accuracy required for each member increases, manufacturing cost also increases.

Other than the above, JP-A-2002-266955 describes a configuration where the output member and the support member are firmly coupled to each other by coupling members. Both end portions of each coupling member are press-fitted. However, because each coupling member is not in contact with the inner peripheral surface of a corresponding one of the through-holes formed in the planet gear, the coupling members do not contribute to transmission of power. Even if the coupling member is brought into contact with the inner peripheral surface of a corresponding one of the through-holes of the planet gear to thereby transmit power, there is the same problem as that of the speed reduction gear in the related art described in JP-A-7-248046 because both end portions of are press-fitted.

Furthermore, JP-A-7-248046 describes a configuration that includes adjustment pins each having a diameter that varies from portion to portion. The adjustment pins are used to adjust a backlash that occurs in the speed reduction gear, not to transmit power. Then, each adjustment pin has such a dimension that the adjustment pin is in slide contact with the inner peripheral surface of the corresponding pin hole of the output member and the inner peripheral surface of the corresponding pin hole of the support member. That is, even if the adjustment pins are assumed to contribute to transmission of power, a backlash of the output shaft in the circumferential direction is presumed to occur because both end portions of each adjustment pin are not press-fitted to the output member or the support member.

As described above, in the speed change gear in which pins that transmit power are supported at both ends, there is a possibility that a backlash in the circumferential direction may occur or assembling work may become difficult due to various configurations for supporting each end portion of the pin.

SUMMARY OF THE INVENTION

The invention is made in the light of the above-described circumstances, and it is an object of the invention to provide a high-accuracy speed change gear without impairing assembling efficiency.

According to a feature of an example of the invention, paired first and second rotating members respectively have insertion holes having the same diameter. Then, the pin of which one side end portion and the other side end portion are inserted in the respective insertion holes is formed such that the outside diameter of the other side end portion is smaller than the outside diameter of the one side end portion. Thus, the one side end portion of the pin is press-fitted in the corresponding insertion hole with interference, and the other side end portion of the pin is inserted in the corresponding insertion hole in a contact state or with a gap under no pressure.

According to another feature of an example of the invention, one of an internal gear member and an eccentric member is coupled to one of an input shaft and an output shaft, the one side end portion of the pin is press-fitted in the insertion hole of one of the first rotating member and the second rotating member, and the one of the first rotating member and the second rotating member is coupled to the other one of the input shaft and the output shaft. That is, it is assumed that the first rotating member and the second rotating member are not fixed to a housing, or the like, but are coupled to the input shaft or the output shaft. Then, when the above configuration is employed, the other one of the input shaft and the output shaft is coupled to the rotating member having the insertion hole to which the one side end portion of the pin is press-fitted. Thus, the pin extracts only the axial rotation component from the oscillating rotation of the oscillating member, and the rotating member to which the pin is press-fitted and that supports the pin outputs or receives driving force. Therefore, it is possible to further reliably transmit driving force.

According to a further feature of an example of the invention, the pin has an intermediate portion between the one side end portion and the other side end portion, the outside diameter of the intermediate portion is equal to the outside diameter of one of the one side end portion and the other side end portion, and a step portion is formed at a portion at which the intermediate portion is coupled to the other one of the one side end portion and the other side end portion. The intermediate portion of the pin directly or indirectly contacts the cylindrical inner surface of the through-hole of the oscillating member to transmit driving force. Then, the intermediate portion of the pin having the step portion reliably contacts the inner peripheral surface of the through-hole, and the pin is supported at both ends by the insertion holes having the same diameter. Thus, the stability of the operation of the speed change gear may be improved. In addition, which one of the outside diameter of the one side end portion and the other side end portion should be set to be equal to the outside diameter of the intermediate portion is appropriately set on the basis of the structural relationship with other members. The outside diameter of the intermediate portion is set in consideration of, for example, a size required by a rolling bearing interposed between the intermediate portion and the inner peripheral surface of the through-hole, interference of the press-fitted one side end portion, and the like.

According to another feature of the invention, by way of example, the other side end portion of the pin is loosely fitted in one of the insertion hole of the first rotating member and the insertion hole of the second rotating member. It is known that, when a shaft member, such as the pin, is fitted in a hole, generally, there are three types of fit depending on the dimensional relationship, that is, interference fit by which interference is formed between the shaft member and the inner peripheral surface of the hole, loose fit by which a gap is formed between the shaft member and the inner peripheral surface of the hole and medium fit that is in between the interference fit and the loose fit. The interference fit is a state where the one side end portion of the pin is press-fitted in the corresponding insertion hole. Then, the other side end portion of the pin is inserted in the corresponding insertion hole with a gap between the pin and the inner peripheral surface of the insertion hole so as to achieve a loose fit. Thus, for example, when the rotating member is assembled to the inside of the internal gear member at the last stage of the work for assembling the speed change gear, it is possible to allow the protruding pin to be easily inserted into the insertion hole. In this way, the pin may be reliably supported at both ends without impairing the efficiency of assembling the speed change gear.

Further by way of example, according to another aspect of the invention, the insertion hole of the first rotating member and the insertion hole of the second rotating member are formed at the same time with the same tool. The speed change gear according to the aspect of the invention is formed such that the outside diameter of the other side end portion of the pin is smaller than the outside diameter of the one side end portion of the pin. Then, the first rotating member and the second rotating member that support the pin at both ends respectively have the pin insertion holes having the same diameter.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
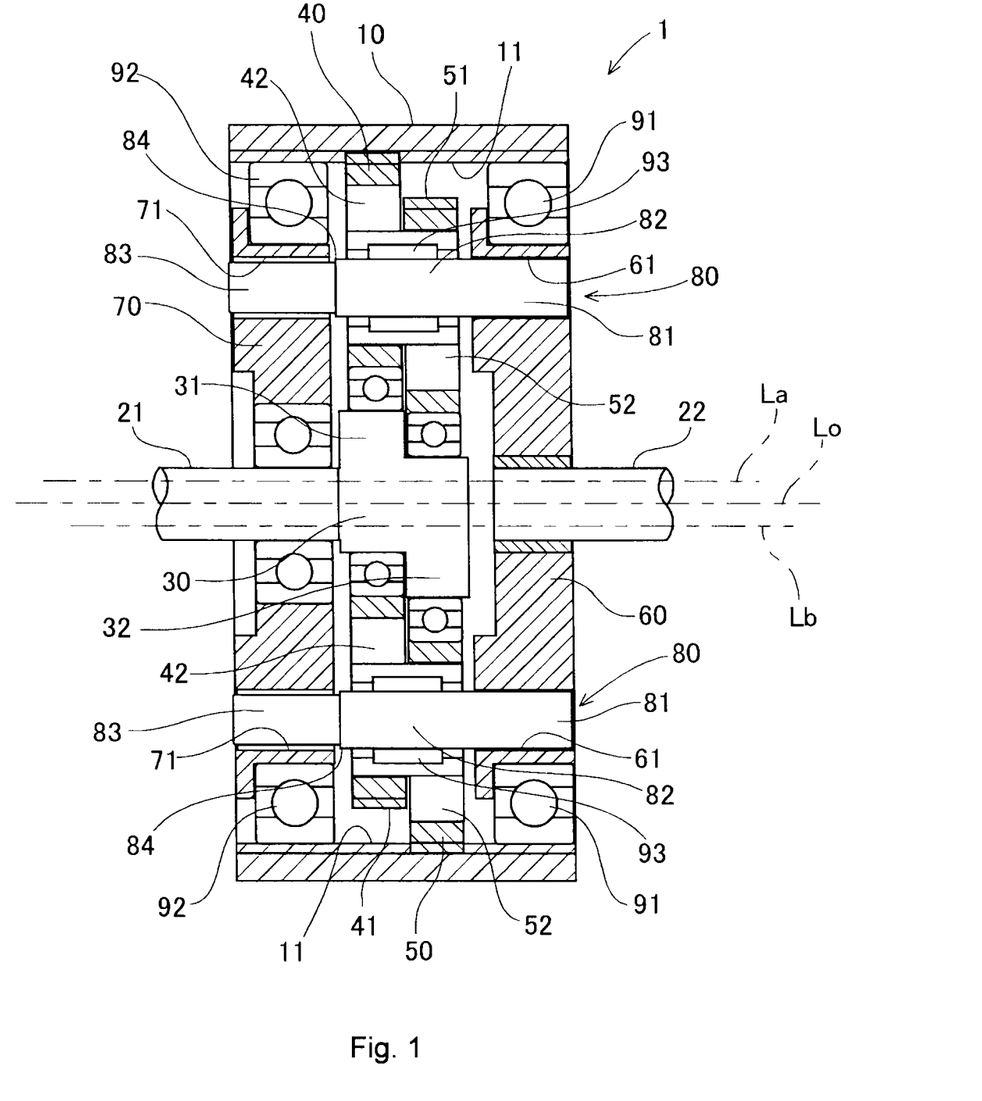
FIG. 1 is a sectional view that shows the configuration of a speed reduction gear.
Figure 2:
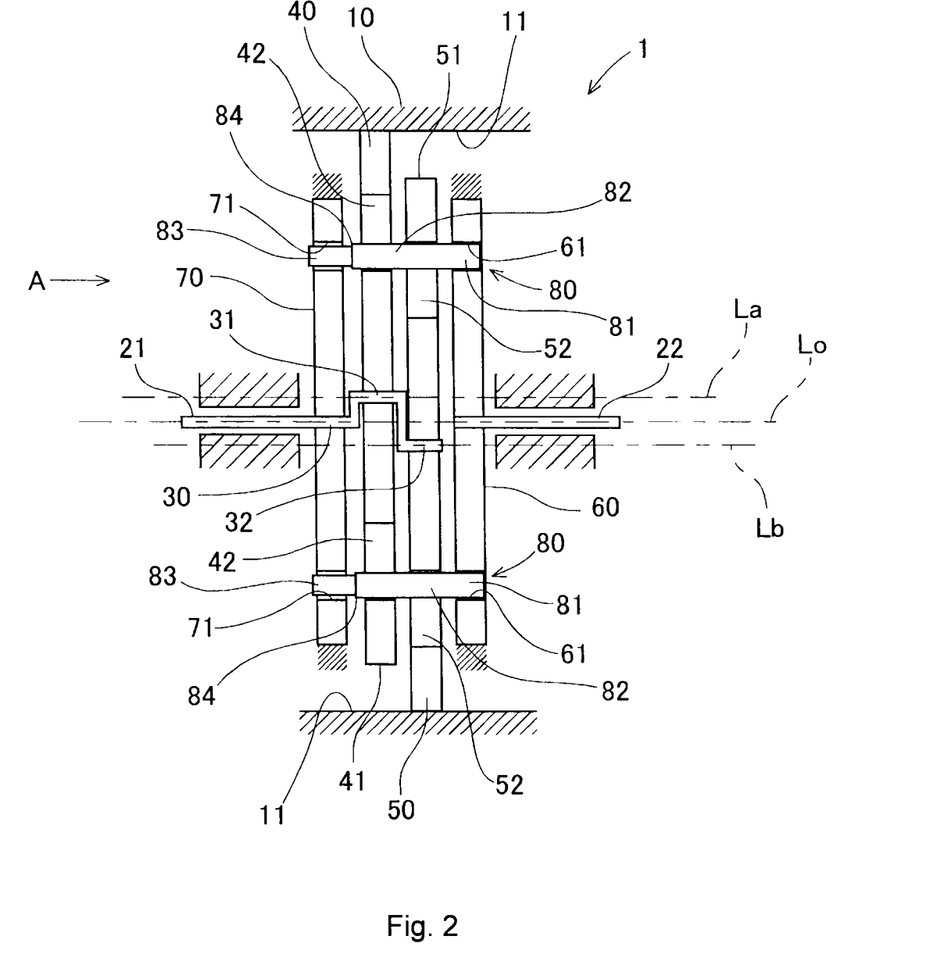
FIG. 2 is a conceptual view that shows the basic configuration of the speed reduction gear.
Figure 3:
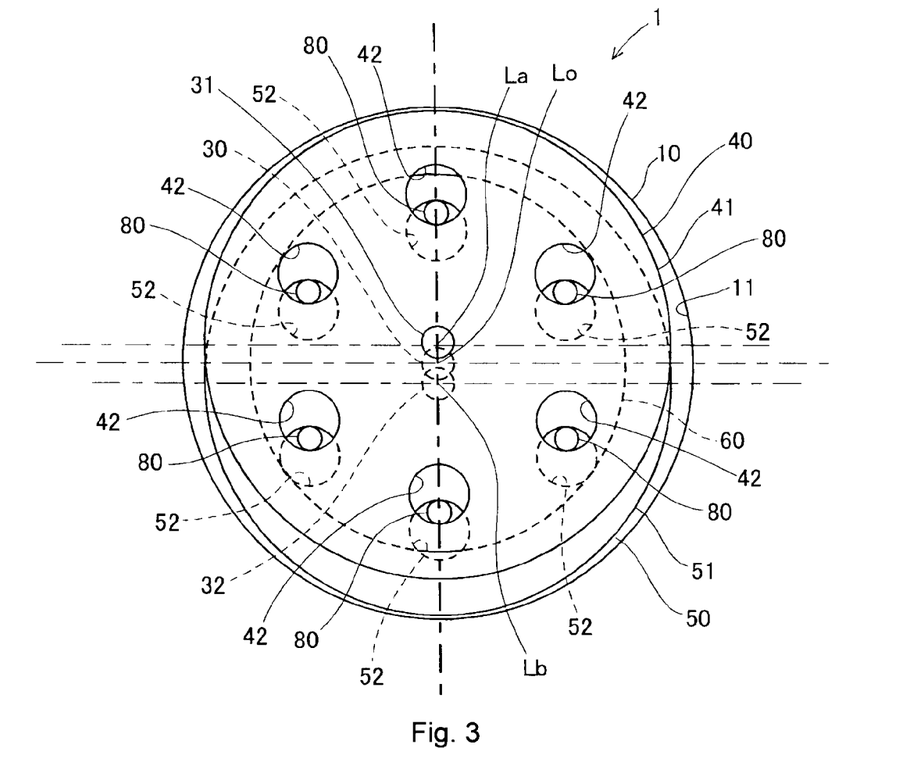
FIG. 3 is a view when viewed in direction of the arrow A in FIG. 2 through a support plate.
Figure 4:
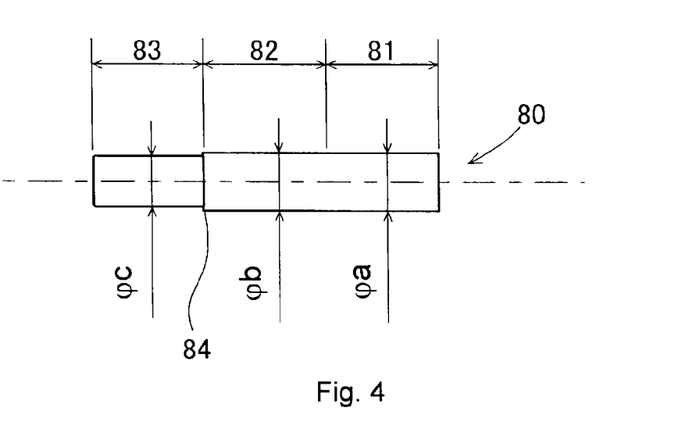
FIG. 4 is a side view that shows a pin.
Figure 5:
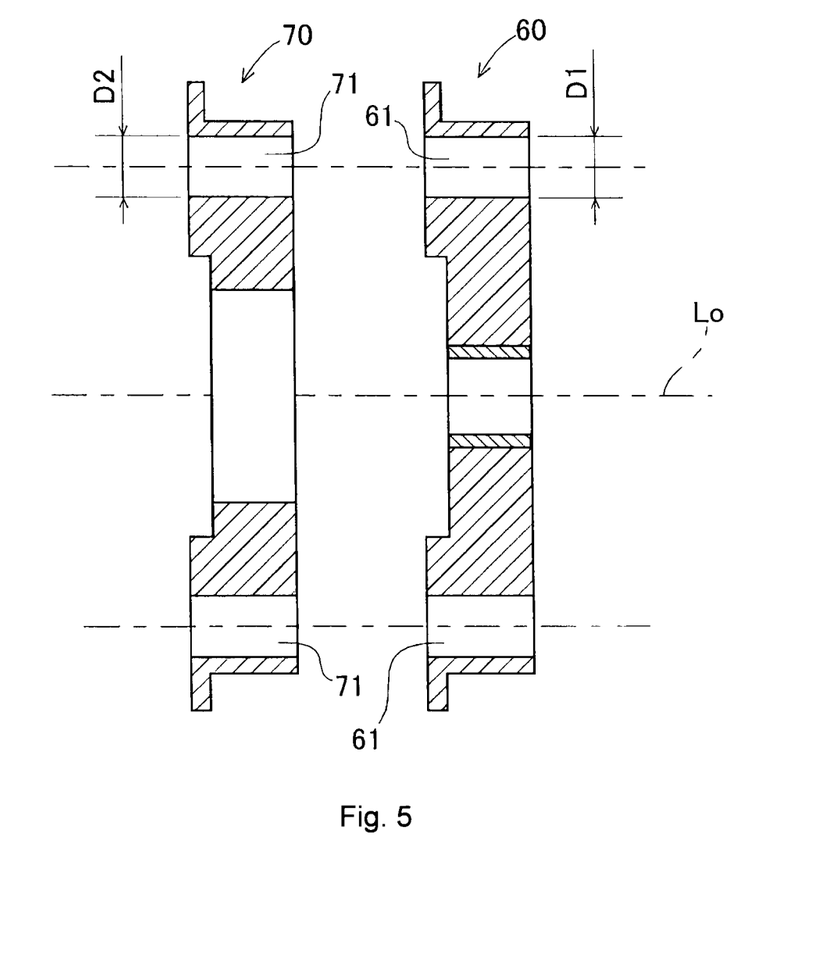
FIG. 5 is a side view that shows an output plate and the support plate.

Hereinafter, a speed change gear according to an embodiment of the invention will be described with reference to the accompanying drawings. A speed reduction gear 1 to which the speed change gear according to the invention is applied will be described with reference to FIG. 1 to FIG. 5. FIG. 1 is a sectional view that shows the configuration of the speed reduction gear 1. FIG. 2 is a conceptual view that shows the basic configuration of the speed reduction gear 1. FIG. 3 is a view when viewed in the direction of the arrow A in FIG. 2 through a support plate 70. FIG. 4 is a side view that shows a pin 80 in the speed reduction gear 1. FIG. 5 is a side view that shows an output plate 60 and the support plate 70 in the speed reduction gear 1.

The speed reduction gear 1 is formed mainly of a housing 10, an input shaft member 21, an output shaft member 22, a crankshaft 30, a first oscillating member 40, a second oscillating member 50, the output plate 60, the support plate 70, the pins 80 and bearings 91 to 93. As shown in FIG. 1, the housing 10 (which corresponds to an "internal gear member" according to the invention) is a case that supports the input shaft member 21 and the output shaft member 22 rotatably about a common input/output axis Lo and that accommodates a speed change mechanism. The speed change mechanism is formed of various members, and reduces a speed. In addition, the housing 10 has an internal gear 11 on its inner peripheral surface. The internal gear 11 extends in a direction along the input/output axis Lo.

The input shaft member 21 is an input shaft that is coupled to a rotor of a motor (not shown) and that is driven and rotated by the motor. The input shaft member 21 is rotatably supported by the housing 10 via the support plate 70 (described later). Thus, the input shaft member 21 is rotatable about the input/output axis Lo. In addition, the input shaft member 21 is arranged at one side (left side in FIG. 1 and FIG. 2) of the speed reduction gear 1, and the other side end portion of the input shaft member 21 is coupled to the crankshaft 30 (described later).

The output shaft member 22 is an output shaft that outputs rotation of which the speed is reduced by the speed change mechanism accommodated in the housing 10. The output shaft member 22 is arranged at the other side (right side in FIG. 1 and FIG. 2) of the speed reduction gear 1, and one side end portion of the output shaft member 22 is coupled to the output plate 60 (described later). Then, the output shaft member 22 is rotatably supported by the housing 10 via the output plate 60. Thus, the output shaft member 22 is rotatable about the input/output axis Lo.

The crankshaft 30 has a first eccentric portion 31 and a second eccentric portion 32. The first eccentric portion 31 and the second eccentric portion 32 correspond to an "eccentric member" according to the invention. The first eccentric portion 31 has an eccentric shape that is eccentric with respect to the axis of the crankshaft 30 (input/output axis Lo). The first eccentric portion 31 is arranged at an input side (left side in FIG. 1) of the crankshaft 30, and is integrally formed with the crankshaft 30. In addition, the sectional shape of the first eccentric portion 31 is a perfect circle that centers on a first eccentric axis La that is eccentric in the radial direction of the crankshaft 30 with respect to the input/output axis Lo. Then, the first eccentric portion 31 rotates about the input/output axis Lo as the crankshaft 30 rotates about the input/output axis Lo.

The second eccentric portion 32 as well as the first eccentric portion 31 has an eccentric shape that is eccentric with respect to the axis of the crankshaft 30 (input/output axis Lo). The second eccentric portion 32 is arranged at an output side (right side in FIG. 1) with respect to the first eccentric portion 31. Then, the second eccentric portion 32 is coupled to the first eccentric portion 31, and is integrally formed with the crankshaft 30. In addition, the sectional shape of the second eccentric portion 32 is a perfect circle that centers on a second eccentric axis Lb that is eccentric in the radial direction of the crankshaft 30 with respect to the input/output axis Lo. Then, the second eccentric portion 32 rotates about the input/output axis Lo as the crankshaft 30 rotates about the input/output axis Lo.

As described above, the crankshaft 30 has the first eccentric portion 31 and the second eccentric portion 32 that are contiguously formed in the direction along the input/output axis Lo. In addition, the first eccentric portion 31 and the second eccentric portion 32 are coupled to each other such that their eccentric directions with respect to the input/output axis Lo are opposite to each other. In other words, in the present embodiment, the first eccentric portion 31 and the second eccentric portion 32 that are two eccentric members are coupled to each other at an interval of 180 (deg) so as to be arranged at equiangular positions in the circumferential direction of the output plate 60.

In addition, one side end portion (left side in FIG. 1) of the crankshaft 30 is coupled to the input shaft member 21. Thus, the crankshaft 30 rotates about the input/output axis Lo as the input shaft member 21 rotates. In addition, with the above configuration, the first eccentric portion 31 and second eccentric portion 32 of the crankshaft 30 are coupled to the input shaft member 21 via the crankshaft 30.

The first oscillating member 40 has an annular shape. As shown in FIG. 1 and FIG. 2, the first oscillating member 40 is a planet gear that has an external gear 41 and through-holes 42, and that is rotatably supported on the outer peripheral side of the first eccentric portion 31. The external gear 41 is formed on the outer peripheral surface of the first oscillating member 40 and is able to be in mesh with the internal gear 11 of the housing 10. The through-holes 42 each have a cylindrical inner surface that centers on a position spaced apart in the radial direction of the crankshaft 30 from the input/output axis Lo. The inside diameter of each through-hole 42 of the first oscillating member 40 is substantially equal to the sum of the diameter of each pin 80, which passes through the through-hole 42, and the eccentric amount (distance between the input/output axis Lo and the first eccentric axis La) of the first oscillating member 40. Because a bearing 93 is fitted around each pin 80 in the present embodiment, the above "diameter of each pin 80" substantially corresponds to the diameter of each bearing 93.

More specifically, the inner peripheral surfaces of the through-holes 42 of the first oscillating member 40 contact the outer peripheral surfaces of the bearings 93 fitted around the respective pins 80 to transmit driving force in a state where the speed reduction gear 1 is driven. With the above configuration, the first oscillating member 40 oscillatingly rotates so as to revolve around the input/output axis Lo while rotating about the first eccentric axis La as the first eccentric portion 31 rotates about the input/output axis Lo. Then, the axial rotation component of the oscillatingly rotating first oscillating member 40 is transmitted to the pins 80, and the output plate 60 rotates at the rotational speed at which the first oscillating member 40 rotates on its axis.

The second oscillating member 50 as well as the first oscillating member 40 has an annular shape. As shown in FIG. 1 and FIG. 2, the second oscillating member 50 is a planet gear that has an external gear 51 and through-holes 52, and that is rotatably supported on the outer peripheral side of the second eccentric portion 32. The external gear 51 is formed on the outer peripheral surface of the second oscillating member 50 and is able to be in mesh with the internal gear 11 of the housing 10. The through-holes 52 each have a cylindrical inner surface that centers on a position spaced apart in the radial direction of the crankshaft 30 from the input/output axis Lo. The inside diameter of each through-hole 52 of the second oscillating member 50 is substantially equal to the sum of the diameter of each inserted pin 80 and the eccentric amount (distance between the input/output axis Lo and the second eccentric axis Lb) of the second oscillating member 50.

More specifically, the inner peripheral surfaces of the through-holes 52 of the second oscillating member 50 contact the outer peripheral surfaces of the bearings 93 fitted around the respective pins 80 to transmit driving force in a state where the speed reduction gear 1 is driven. With the above configuration, the second oscillating member 50 oscillatingly rotates so as to revolve around the input/output axis Lo while rotating about the second eccentric axis Lb as the second eccentric portion 32 rotates about the input/output axis Lo. Then, the axial rotation component of the oscillatingly rotating second oscillating member 50 is transmitted to the pins 80, and the output plate 60 rotates at the rotational speed at which the second oscillating member 50 rotates on its axis.

In addition, the first eccentric portion 31 and second eccentric portion 32 of the crankshaft 30 are coupled to each other so as to be arranged at equiangular positions in the circumferential direction of the output plate 60. Thus, the first and second oscillating members 40 and 50 that are respectively supported on the outer peripheral sides of the first and second eccentric portions 31 and 32 are located at equiangular positions in the circumferential direction of the output plate 60. Here, it is assumed that, in a state where the speed reduction gear 1 is driven, the first and second eccentric portions 31 and 32 rotate with the rotation of the crankshaft 30 and then the first and second oscillating members 40 and 50 oscillatingly rotate with the rotation of the first and second eccentric portions 31 and 32. In this case, the respective rotation axes (first eccentric axis La and second eccentric axis Lb) of the first and second oscillating members 40 and 50 rotate around the input/output axis Lo while maintaining the symmetrical positions with respect to the input/output axis Lo due to the above positional relationship.

As shown in FIG. 1, the output plate 60 (which corresponds to a "first rotating member" according to the invention) is a disc-shaped member that is supported by the housing 10 via the bearing 91 rotatably about the input/output axis Lo. The output plate 60 has insertion holes 61 each of which has a cylindrical inner surface and is smaller in diameter than those of the through-holes 42 and 52 of the first and second oscillating members 40 and 50. One side end portions 81 of the pins 80 are press-fitted in the insertion holes 61 of the output plate 60 such that the pins 80 protrude from one side disc surface of the output plate 60 in the speed reduction gear 1 in the direction along the input/output axis Lo.

Thus, the inside diameter D1 of each insertion hole 61 of the output plate 60 is smaller by the amount of interference than the outside diameter φa of the one side end portion 81 of each pin 80. In addition, in the present embodiment, as shown in FIG. 3, the six pins 80 are fixed to the disc surface so as to be arranged at equiangular positions in the circumferential direction of the output plate 60. In addition, the other side disc surface is coupled to the output shaft member 22.

The support plate 70 (which corresponds to a "second rotating member" according to the invention) is a disc member that is supported by the housing 10 via the bearing 92 rotatably about the input/output axis Lo. The support plate 70 has insertion holes 71 each of which has a cylindrical inner surface and is smaller in diameter than those of the through-holes 42 and 52 of the first and second oscillating members 40 and 50. The other side end portions 83 of the pins 80 that extend through the through-holes 42 and 52 of the first and second oscillating members 40 and 50 are inserted in the insertion holes 71 of the support plate 70. The support plate 70 supports the other side end portions 83. Thus, the support plate 70 supports the six pins 80 that are fixed to the output plate 60, and rotates at the same rotational speed as the output plate 60 as the output plate 60 rotates.

In addition, an inside diameter D2 of each insertion hole 71 of the support plate 70 is set such that the other side end portion 83 of each pin 80 is inserted with a gap. That is, the inside diameter D2 of each insertion hole 71 of the support plate 70 is larger than the outside diameter φc of the other side end portion 83 of each pin 80. Furthermore, the inside diameter D2 of each insertion hole 71 is equal to the inside diameter D1 of each insertion hole 61 of the output plate 60. The thus configured output plate 60 and support plate 70 are a pair of rotating members that are arranged so as to face each other in the direction along the input/output axis Lo across the first and second oscillating members 40 and 50.

As shown in FIG. 1, each pin 80 is an integrated stepped columnar member that is formed of the one side end portion 81, an intermediate portion 82, the other side end portion 83 and a step portion 84. The one side end portion 81 of each pin 80 is inserted in a corresponding one of the insertion holes 61 of the output plate 60, and the other side end portion 83 of each pin 80 is inserted in a corresponding one of the insertion holes 71 of the support plate 70. Thus, each pin 80 is supported at both ends. In addition, the intermediate portion 82 between the one side end portion 81 and the other side end portion 83 extends through the corresponding through-holes 42 and 52 of the first and second oscillating members 40 and 50.

Here, the inside diameter D1 of each insertion hole 61 of the output plate 60, in which the one side end portion 81 of a corresponding one of the pins 80 is inserted, is equal to the inside diameter D2 of each insertion hole 71 of the support plate 70, in which the other side end portion 83 is inserted. In addition, each one side end portion 81 is press-fitted in a corresponding one of the insertion holes 61 of the output plate 60 with a predetermined interference. In contrast to this, the other side end portion 83 is loosely fitted in a corresponding one of the insertion holes 71 of the support plate 70. Therefore, as shown in FIG. 4, the outside diameter φc of the other side end portion 83 of each pin 80 is smaller than the outside diameter φa of the one side end portion 81. In addition, in the present embodiment, the outside diameter φb of each intermediate portion 82 is equal to the outside diameter φa of each one side end portion 81. Thus, the step portion 84 is formed at a portion at which the intermediate portion 82 is coupled to the other side end portion 83.

Due to the above described dimensional relationship, there is a gap between the outer peripheral surface of each of the other side end portions 83 and the inner peripheral surface of a corresponding one of the insertion holes 71. Therefore, the support plate 70 may be removed in a state where the speed reduction gear 1 is assembled. In addition, the gap is set to such a size that the outer peripheral surface of each of the other side end portions 83 is substantially in contact with the inner peripheral surface of a corresponding one of the insertion holes 71 in a state where the speed reduction gear 1 is driven, and the insertion holes 71 respectively support the other side end portions 83 of the pins 80 that are transmitting driving force. As described above, each pin 80 is supported at both ends by the output plate 60 and the support plate 70.

In addition, the bearing 93, which is a rolling bearing, is rotatably fitted around the outer peripheral side of each intermediate portion 82. Thus, part of each bearing 93 contacts the inner peripheral surfaces of these through-holes 42 and 52, and each pin 80 transmits driving force via the bearing 93 between the first and second oscillating members 40 and 50 while the position at which part of the bearing 93 contacts the inner peripheral surfaces of the through-holes 42 and 52 changes.

Subsequently, the operation of the speed reduction gear 1 according to the present embodiment will be described. First, as the motor (not shown) is operated, the input shaft member 21 coupled to the rotor of the motor rotates. As the input shaft member 21 rotates, the crankshaft 30 coupled to the input shaft member 21 rotates about the input/output axis Lo. Thus, the first eccentric portion 31 and the second eccentric portion 32 that constitute the crankshaft 30 rotate.

Then, the first oscillating member 40 supported on the outer peripheral side of the first eccentric portion 31 oscillatingly rotates as the first eccentric portion 31 rotates. Similarly, the second oscillating member 50 supported on the outer peripheral side of the second eccentric portion 32 oscillatingly rotates as the second eccentric portion 32 rotates. At this time, only parts of the circumferences of the respective external gears 41 and 51 of the first oscillating member 40 and second oscillating member 50 are in mesh with the internal gear 11 of the housing 10, and the first oscillating member 40 and the second oscillating member 50 rotate at a rotational speed based on the difference in the number of teeth from the internal gear 11 in a direction opposite to the direction in which the input shaft member 21 rotates (that is, the counterclockwise direction when the input shaft member 21 rotates in the clockwise direction).

Here, each pin 80 is inserted in the through-holes 42 and 52 of the first and second oscillating members 40 and 50. Then, only parts of the circumferences of the outer peripheral surfaces of the bearings 93 fitted around the intermediate portions 82 transmit contact the inner peripheral surfaces of the through-holes 42 and 52 and transmit driving force. Thus, as the first and second oscillating members 40 and 50 oscillatingly rotate, the axial rotation component is transmitted to the pins 80. Then, the output plate 60 rotates at a rotational speed at which the first and second oscillating members 40 and 50 rotate on their axes.

In this way, the output plate 60 extracts the axial rotation component from the oscillating rotation of the first and second oscillating members 40 and 50 via the pins 80, and the speed reduction gear 1 reduces the speed of rotation input in the crankshaft 30 and then outputs the rotation from the output plate 60. Then, the output shaft member 22 coupled to the output plate 60 rotates about the input/output axis Lo. Thus, the speed reduction gear 1 reduces the speed of rotation of the input shaft member 21 and then outputs the rotation from the output shaft member 22.

In addition, when the speed is changed by the speed reduction gear 1, as the output plate 60 rotates about the input/output axis Lo, the outer peripheral surface of the other side end portion 83 of each pin 80 contacts the inner peripheral surface of a corresponding one of the insertion holes 71 of the support plate 70. The support plate 70 is supported by the housing 10 via the bearing 92 rotatably about the input/output axis Lo. That is, in a state where the speed reduction gear 1 is driven, the support plate 70 contacts the other side end portions 83 of the pins 80, and is driven and rotated by the output plate 60. Thus, for example, when strong driving force is transmitted to the speed reduction gear 1 and then external force that causes the pins 80 to bend is exerted, the support plate 70 supports the other side end portions 83 of the pins 80 that contact the inner peripheral surfaces of the insertion holes 71.

Next, work for assembling the speed reduction gear 1 will be described. First, the output shaft member 22 is fixedly fitted to the output plate 60. The one side end portions 81 of the plurality of pins 80 are fixedly press-fitted respectively into the plurality of insertion holes 61 formed in the output plate 60. Subsequently, the bearing 91 for rotatably supporting the output plate 60 is preliminarily arranged in advance at a predetermined position inside the housing 10. Then, the output plate 60 to which the plurality of pins 80 are press-fitted is inserted inside the housing 10, and is assembled such that the output plate 60 is supported by the bearing 91.

After that, the first and second oscillating members 40 and 50 are respectively fitted via bearings around the outer peripheral surfaces of the first and second eccentric portions 31 and 32 of the crankshaft 30 with which the input shaft member 21 is integrally formed. Then, the bearings 93 are inserted into the through-holes 42 and 52 of the first and second oscillating members 40 and 50. Subsequently, the crankshaft 30 to which the first and second oscillating members 40 and 50 is assembled is assembled to the inside of the housing 10. At this time, the plurality of pins 80 are respectively inserted into the inner peripheral surfaces of the bearings 93 that are inserted in the through-holes 42 and 52. Thus, the bearings 93 are fitted around the intermediate portions 82 of the pins 80. Furthermore, the external gears 41 and 51 of the first and second oscillating members 40 and 50 are appropriately adjusted so as to be in mesh with the internal gear 11 of the housing 10.

The bearing 92 for rotatably supporting the support plate 70 is arranged at a predetermined position inside the housing 10. Lastly, the support plate 70 is inserted to the inside of the housing 10, and is assembled such that the support plate 70 is supported by the bearing 92. At this time, the input shaft member 21 is extended through the inner peripheral portion of the support plate 70 such that the cylindrical inner surface of the support plate 70 rotatably supports the input shaft member 21 via the bearing.

Furthermore, the other side end portions 83 of the plurality of pins 80 extended through the through-holes 42 and 52 of the first and second oscillating members 40 and 50 are inserted into the insertion holes 71 of the support plate 70. A predetermined gap is formed between the inner peripheral surface of each insertion hole 71 and the other side end portion 83 of a corresponding one of the pins 80 so as to loosely fit the other side end portion 83 of each pin 80 into the corresponding insertion hole 71.

As described above, at the last stage of the work for assembling the speed reduction gear 1, the support plate 70 is arranged inside the housing 10. At this time, in order to loosely fit the other side end portions 83 of the pins 80, the support plate 70 is configured such that the inside diameter D2 of each insertion hole 71 is larger than the outside diameter $\phi c$ of each of the other side end portions 83. Here, preferably, the inside diameter D2 of each insertion hole 71 is made as small as possible to reduce a backlash, in order to support a corresponding one of the pins 80 in a state where the speed reduction gear 1 is driven. This is because each pin 80 is supported more easily as the gap for loosely fitting the pin 80 is reduced. Similarly, if the outside diameter $\phi c$ of the other side end portion 83 of each pin 80 is as large as possible, the gap for loosely fitting the pin 80 is reduced. However, a clearance reduces if the inside diameter D2 of each insertion hole 71 is excessively close to the outside diameter $\phi c$ of each of the other side end portions 83. Therefore, assembling work may be difficult if there is a machining error, or the like, of any one of the insertion holes 71.

Therefore, the present embodiment employs a manufacturing method for forming the insertion holes 61 of the output plate 60, into which the pins 80 are press-fitted, and the insertion holes 71 of the support plate 70, into which the pins 80 are loosely fitted, at the same time with the same tool. Thus, as shown in FIG. 5, the center of the cylindrical inner surface of each of the insertion holes 61 of the output plate 60 coincides with the center of the cylindrical inner surface of a corresponding one of the insertion holes 71 of the support plate 70. Therefore, the above machining error may be significantly reduced. Thus, the inside diameter D2 of each insertion hole 71 of the support plate 70 may be brought close to the outside diameter $\phi c$ of the other side end portion 83 of each pin 80 (a clearance may be reduced) as compared with the related art. Therefore, it is possible to reduce a backlash of each of the other side end portions 83 in a corresponding one of the insertion holes 71 without impairing assembling efficiency.

With the speed reduction gear 1 to which the speed change gear according to the invention is applied, the respective insertion holes 61 and 71 of the output plate 60 and support plate 70 that are the pair of rotating members have the same diameter. Then, the pins 80 of which the ends portions 81 and 83 are inserted into the respective insertion holes 61 and 71 are configured such that the outside diameter $\phi c$ of each of the other side end portions 83 is smaller than the outside diameter $\phi a$ of each of the one side end portions 81. Thus, the one side end portion 81 of each pin 80 is press-fitted in a corresponding one of the insertion holes 61 with interference, and the other side end portion 83 of each pin 80 is inserted in a corresponding one of the insertion holes 71 in a contact state or with a gap under no pressure.

The speed reduction gear 1 is configured such that the insertion holes 61 of the output plate 60 support the pins 80 that are press-fitted therein and the insertion holes 71 of the support plate 70 support the pins 80 in a contact state or with a gap under no pressure. Although the pins 80 are supported in this way, the insertion holes 61 and 71 may have the same diameter due to the configuration of each pin 80. When the pin according to the related art is formed to have the same diameter in the longitudinal direction, both end portions of the pin also have the same diameter. Therefore, when each pin is supported at both ends by press-fitting the one side end portion 81 and loosely fitting the other side end portion 83 as described above, the insertion holes formed in the support members that support the pins at both ends cannot have the same diameter. Then, each insertion hole of the support member, which has a large diameter, is set to have a tolerance in consideration of a machining error of each insertion hole of the support member, which has a small diameter, or a tolerance that ensures predetermined assembling efficiency. Therefore, the insertion holes of the support member, which have a large diameter, may have a large backlash, as pin holes that support the pins.

In contrast to this, the insertion holes 61 and 71 of the speed reduction gear 1 may have the same diameter. Thus, the inside diameter D2 of each of the insertion holes 71 that support the pins 80 is close to the outside diameter $\phi c$ of each of the other side end portions 83 to reduce a clearance to thereby make it possible to reduce a backlash. Thus, in a state where the speed reduction gear 1 is driven, the pins 80 may be reliably supported at both ends, the stability of the operation of the speed reduction gear 1 may be improved, and the high accuracy of the device may be ensured as a whole.

In addition, the first and second eccentric portions 31 and 32 that constitute the crankshaft 30 are coupled to the input shaft member 21. Furthermore, the one side end portions 81 of the pins 80 are press-fitted in the insertion holes 61 of the output plate 60, and the output plate 60 is coupled to the output shaft member 22. When the above configuration is employed, the output shaft member 22 is coupled to the output plate 60 that has the insertion holes 61 in which the one side end portions 81 of the pins 80 are press-fitted. Thus, the pins 80 extract only the axial rotation component from the oscillating rotation of the first and second oscillating members 40 and 50 and then the output plate 60, to which the pins 80 are press-fitted and which supports the pins 80, outputs driving force. Therefore, it is possible to further reliably transmit driving force.

Furthermore, the outside diameter $\phi b$ of the intermediate portion 82 of each pin 80 is equal to the outside diameter $\phi a$ of the one side end portion 81 of each pin 80. Then, the step portion 84 is formed at a portion at which each intermediate portion 82 is coupled to a corresponding one of the other side end portions 83. The intermediate portion 82 of each pin 80 indirectly contacts the cylindrical inner surfaces of the through-holes 42 and 52 of the first and second oscillating members 40 and 50 via the bearing 93 to transmit driving force. Then, the intermediate portion 82 of each pin 80 having the step portion 84 reliably contacts the inner peripheral surfaces of the through-holes 42 and 52, and the pin 80 is respectively supported at both end portions 81 and 83 by the insertion holes 61 and 71 having the same diameter. Thus, the stability of the operation of the speed reduction gear 1 may be improved, and the high accuracy of the device may be ensured as a whole.

In addition, the other side end portion 83 of each pin 80 is loosely fitted in a corresponding one of the insertion holes 71 of the support plate 70. It is known that, when a shaft member, such as the pin 80, is fitted in a hole, generally, there are three types of fit depending on the dimensional relationship, that is, interference fit by which interference is formed between the shaft member and the inner peripheral surface of the hole, loose fit by which a gap is formed between the shaft member and the inner peripheral surface of the hole and medium fit that is in between the interference fit and the loose fit. The interference fit is a state where the one side end portion 81 of each pin 80 is press-fitted in a corresponding one of the insertion holes 61 in the present embodiment. Then, the other side end portion 83 of each pin 80 is inserted in a corresponding one of the insertion holes 71 with a gap so as to achieve a loose fit. Thus, when the support plate 70 is assembled to the inside of the housing 10 at the last stage of the work for assembling the speed reduction gear 1, it is possible to make it easier to insert the protruding pins 80 into the insertion holes 71. In this way, the pins 80 may be reliably supported at both ends without impairing the efficiency of assembling the speed reduction gear 1.

Furthermore, the insertion holes 61 of the output plate 60 and the insertion holes 71 of the support plate 70 are formed at the same time with the same tool. Thus, the centers of the insertion holes 61 and 71 into which the same pin 80 is inserted coincide with each other. Thus, each insertion hole 71 to which the pin 80 is loosely fitted does not need a tolerance for absorbing a machining error of the insertion hole 61 to which the pin 80 is press-fitted. Thus, the inside diameter D2 of each insertion hole 71 is brought close to the outside diameter $\phi c$ of each of the other side end portions 83. Therefore, it is possible to reduce a backlash in a state where the speed reduction gear 1 is driven and to further reliably support the pins 80 at both ends, and it is possible to improve the accuracy of the device as a whole.

Figure 6:
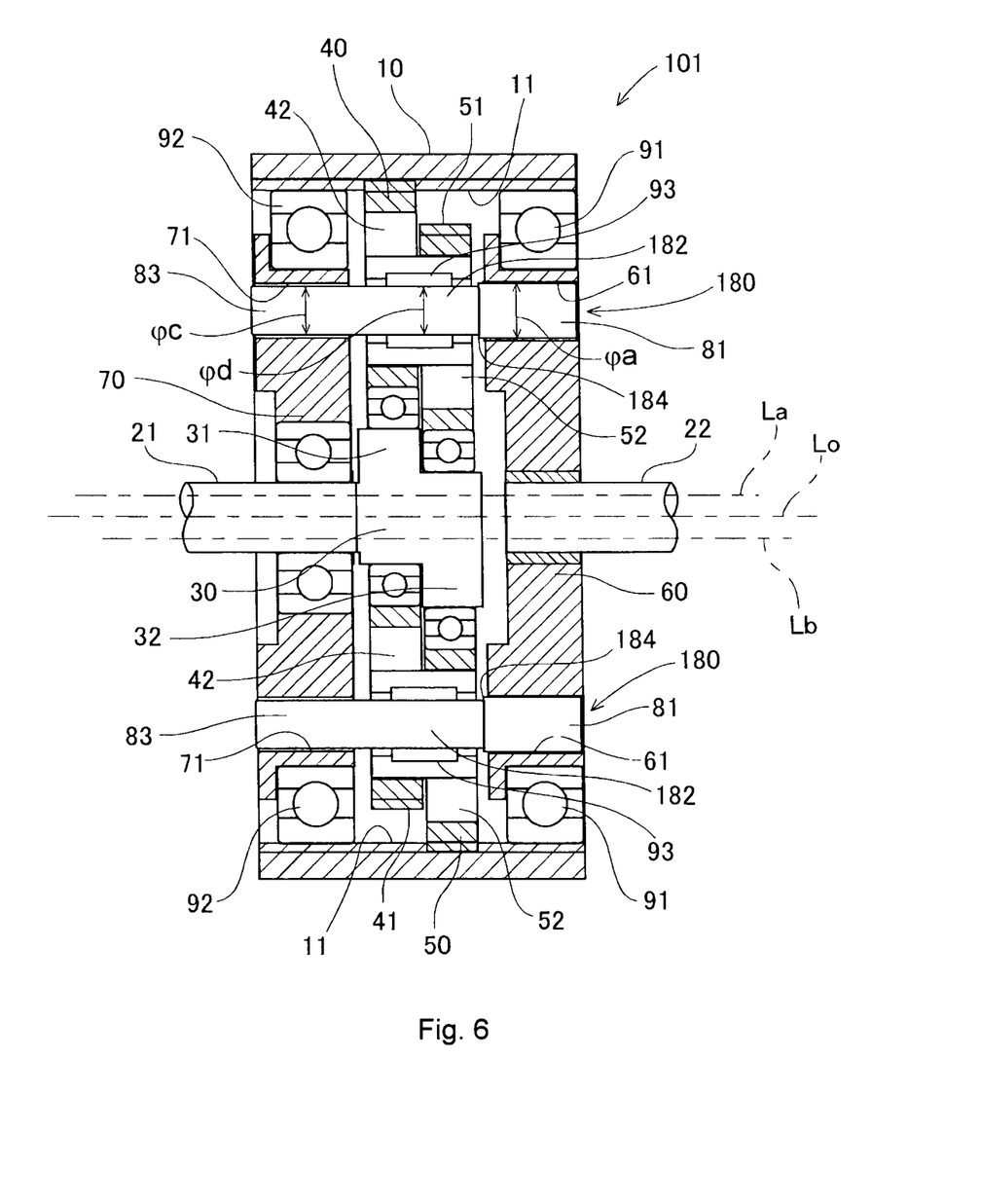
FIG. 6 is a sectional view that shows the configuration of a speed reduction gear according to another embodiment.

Next, an alternative embodiment of the present embodiment will be described with reference to FIG. 6. FIG. 6 is a sectional view that shows the configuration of a speed reduction gear 101. In the above embodiment, the pins 80 of the speed reduction gear 1 are formed such that the outside diameter $\phi b$ of each intermediate portion 82 is equal to the outside diameter $\phi a$ of each of the one side end portions 81. In contrast to this, pins 180 of the speed reduction gear 101 according to the alternative embodiment are formed such that, as shown in FIG. 6, the outside diameter $\phi d$ of each intermediate portion 182 is equal to the outside diameter $\phi c$ of each of the other side end portions 83. In accordance with this, a step portion 184 is formed at a portion at which the intermediate portion 182 of each pin 180 is coupled to a corresponding one of the one side end portions 81.

With the above configuration, the same advantageous effect as that of the above embodiment is obtained. That is, the stability of the operation of the speed reduction gear 101 may be improved, and the high accuracy of the device may be ensured as a whole. In addition, which one of the outside diameter $\phi a$ of each of the one side end portions 81 and the outside diameter $\phi c$ of each of the other side end portions 83 should be equal to the outside diameter of each of the intermediate portions 182 is appropriately set on the basis of the structural relationship with other members. The outside diameter $\phi b$ of each intermediate portion 82 is set in consideration of, for example, a size required by the bearing 93 interposed between the intermediate portion 82 and the inner peripheral surfaces of the through-holes 42 and 52, interference between the intermediate portion 82 and the press-fitted one side end portion 81, and the like. For example, the outside diameter φb or φd of each intermediate portion 82 or 182 is restricted due to the bearing 93 fitted around the intermediate portion 82 or 182. In this case, the outside diameter φa of each of the one side end portions 81 may be larger than the outside diameter φb or φd of each intermediate portion 82 or 182 so that each of the one side end portions 81 is press-fitted with a sufficient interference.

The speed change gear according to the invention is described as the speed reduction gears 1 and 101. In the above embodiment, the housing 10 serves as an internal gear member and serves as a fixed member in the speed reduction gear 1. Here, the speed reduction gears 1 and 101 are configured such that the housing 10 that serves as the internal gear member, the first and second eccentric portions 31 and 32, the output plate 60 and the support plate 70 rotate relative to one another about the input/output axis Lo to change the speed of rotation of the input shaft member 21 and then transmit driving force to the output shaft member 22. Therefore, the input shaft member 21 and the output shaft member 22 may be coupled to any of the above-described members (the housing 10, the eccentric members 31 and 32, the rotating members 60 and 70).

That is, in the above embodiment, the crankshaft 30 formed of the eccentric members 31 and 32 is coupled to the input shaft member 21, and the output plate 60 that is the rotating member is coupled to the output shaft member 22. Then, the housing 10 that is the fixed member serves as the internal gear member. The thus configured speed reduction gears 1 and 101 are illustrated. Other than the above, for example, the rotating members 60 and 70 may be fixed to the housing, the crankshaft 30 formed of the eccentric members 31 and 32 may be coupled to the input shaft member 21 and driving force may be transmitted to the internal gear member that is coupled to the output shaft member 22. Other than the above, a speed increasing device that employs the speed change gear according to the invention may be configured by inverting the input/output relationship between the input shaft member 21 and the output shaft member 22. With the above configuration as well, the same advantageous effect is obtained.

What is claimed is:

1. A speed change gear comprising:
   an internal gear member that supports an input shaft and an output shaft rotatably about a common input/output axis, and that has an internal gear on its inner peripheral surface;
   an eccentric member that centers on an eccentric axis that is eccentric with respect to the input/output axis;
   an annular oscillating member that is rotatably supported on an outer peripheral side of the eccentric member, that has an external gear that is formed on its outer peripheral surface so as to be able to be in mesh with the internal gear and a through-hole having a cylindrical inner surface that centers on a position radially spaced apart from the input/output axis, and that oscillatingly rotates around the input/output axis;
   a pair of first and second rotating members that are arranged so as to face in a direction along the input/output axis across the oscillating member, that are supported by the internal gear member rotatably about the input/output axis, and each of which has an insertion hole that has a cylindrical inner surface and is smaller in diameter than the through-hole; and
   a columnar pin that is supported at both ends in such a manner that the pin extends through the through-hole, and one side end portion of the pin is inserted in one of the insertion holes of the first rotating member and second rotating member and the other side end portion of the pin is inserted in the other one of the insertion holes of the first rotating member and second rotating member, wherein
   the insertion hole of the first rotating member and the insertion hole of the second rotating member have the same diameter, and
   an outside diameter of the other side end portion of the pin is smaller than an outside diameter of the one side end portion of the pin such that the one side end portion is press-fitted in the corresponding insertion hole with interference and the other side end portion is inserted in the corresponding insertion hole in a contact state or with a gap under no pressure.

2. The speed change gear according to claim 1, wherein:
   one of the internal gear member and the eccentric member is coupled to one of the input shaft and the output shaft, and
   the one side end portion of the pin is press-fitted in the insertion hole of one of the first rotating member and the second rotating member, and the one of the first rotating member and the second rotating member is coupled to the other one of the input shaft and the output shaft.

3. The speed change gear according to claim 1, wherein the pin has an intermediate portion between the one side end portion and the other side end portion, an outside diameter of the intermediate portion is equal to the outside diameter of one of the one side end portion and the other side end portion, and a step portion is formed at a portion at which the intermediate portion is coupled to the other one of the one side end portion and the other side end portion.

4. The speed change gear according to claim 1, wherein the other side end portion of the pin is loosely fitted in one of the insertion hole of the first rotating member and the insertion hole of the second rotating member.

5. A manufacturing method for the speed change gear according to claim 1, comprising:
   forming the insertion hole of the first rotating member and the insertion hole of the second rotating member at the same time with a same tool.

* * * * *